US010342097B2

(12) United States Patent
Kawamata (10) Patent No.: US 10,342,097 B2
(45) Date of Patent: Jul. 2, 2019

(54) ILLUMINATION SYSTEM AND CONTROLLER (71) Applicant: Panasonic Intellectual Property Management Co., Ltd., Osaka (JP)

(72) Inventor: Mototsugu Kawamata, Mie (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/114,825

(22) Filed: Aug. 28, 2018

(65) Prior Publication Data
US 2019/0069372 A1 Feb. 28, 2019

(30) Foreign Application Priority Data

Aug. 31, 2017 (JP) ................. 2017-167929

(51) Int. Cl.
H05B 37/02 (2006.01)
(52) U.S. Cl.
CPC ..... H05B 37/0218 (2013.01); H05B 37/0281 (2013.01)
(58) Field of Classification Search
None
See application file for complete search history.

(56) References Cited

U.S. PATENT DOCUMENTS

2016/0234913 A1* 8/2016 Hidaka ............ H05B 37/0281
2017/0265286 A1* 9/2017 Song ..................... G06F 3/0482

FOREIGN PATENT DOCUMENTS

| JP | H11-214179 A | 8/1999 |
| JP | 2002-367788 A | 12/2002 |
| JP | 2003-133085 A | 5/2003 |
| JP | 2006-147183 A | 6/2006 |
| JP | 2013-120721 A | 6/2013 |
| JP | 2016-149215 A | 8/2016 |

* cited by examiner

Primary Examiner — Jany Richardson
(74) Attorney, Agent, or Firm — McDermott Will & Emery LLP (57) ABSTRACT An illumination system includes: a plurality of luminaires; and a controller including a brightness sensor that is used for light intensity control on one or more luminaires among the plurality of luminaires and detects the brightness of the one or more luminaires. The controller divides the plurality of luminaires into a plurality of groups and performs the light intensity control in a first mode or a second mode for each of the plurality of groups. The first mode is a mode in which the light intensity control is performed according to a result of detection by the brightness sensor, and the second mode is a mode in which the light intensity control is performed according to an instruction on a light intensity rate provided from outside.

13 Claims, 6 Drawing Sheets

| LUMINAIRE | GROUP | OPERATION MODE |
|---|---|---|
| 20a | 30a | FIRST MODE |
| 20b | 30a | FIRST MODE |
| 20c | 30a | FIRST MODE |
| 20d | 30a | FIRST MODE |
| 20e | 30b | SECOND MODE |
| ... | ... | ... |
| 20p | 30d | SECOND MODE |

ILLUMINATION SYSTEM AND CONTROLLER

CROSS REFERENCE TO RELATED APPLICATION

This application claims the benefit of priority of Japanese Patent Application Number 2017-167929 filed on Aug. 31, 2017, the entire content of which is hereby incorporated by reference.

BACKGROUND

1. Technical Field

The present disclosure relates to an illumination system and a controller for controlling luminaires.

2. Description of the Related Art

Conventionally, an illumination system that includes luminaires and a controller including a brightness sensor for performing light intensity control on the luminaires and detecting the brightness of the luminaires has been disclosed (for example, Japanese Unexamined Patent Application Publication No. 2016-149215). For example, this illumination system can maintain the brightness of a region variable by natural light etc. at a predetermined constant brightness, by performing the light intensity control on the luminaires according to a result of detection by the brightness sensor.

SUMMARY

However, there are luminaires which are installed in a region where the brightness is variable by natural light etc. (for example, a region by a window) and on which the light intensity control is performed according to the result of detection by the brightness sensor (also referred to as constant illuminance control), as well as luminaires which are installed in a region where the brightness is less likely to be varied by natural light etc. (for example, a region distant from a window or a room without a window) and on which the constant illuminance control need not be performed but the light intensity control is performed according to, for example, an instruction on a light intensity rate provided from outside (also referred to as external control). Conventional illumination systems have the necessity to prepare both a controller for the luminaires on which the constant illuminance control is performed and a controller for the luminaires on which the external control is performed, thus raising the total cost of the illumination system.

In view of the above, the present disclosure has an object to provide an illumination system and a controller capable of reducing the total cost.

An illumination system according to an aspect of the present disclosure is an illumination system including: a plurality of luminaires; and a controller including a brightness sensor that is used for light intensity control on one or more luminaires among the plurality of luminaires and detects the brightness of the one or more luminaires. The controller divides the plurality of luminaires into a plurality of groups and performs the light intensity control in a first mode or a second mode for each of the plurality of groups. The first mode is a mode in which the light intensity control is performed according to a result of detection by the brightness sensor, and the second mode is a mode in which the light intensity control is performed according to an instruction on a light intensity rate provided from outside.

A controller according to an aspect of the present disclosure is a controller in an illumination system that includes a plurality of luminaires and the controller including a brightness sensor used for light intensity control on one or more luminaires among the plurality of luminaires and detecting the brightness of the one or more luminaires. The controller divides the plurality of luminaires into a plurality of groups and performs the light intensity control in a first mode or a second mode for each of the plurality of groups. The first mode is a mode in which the light intensity control is performed according to a result of detection by the brightness sensor, and the second mode is a mode in which the light intensity control is performed according to an instruction on a light intensity rate provided from outside.

An illumination system and a controller according to an aspect of the present disclosure are capable of reducing the total cost.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT(S)

Hereinafter, an embodiment of the present disclosure is described in detail with reference to the drawings. Note that the embodiment described below illustrates a specific example of the present disclosure. Therefore, the numerical values, structural elements, and the arrangement and connection of the structural elements, etc. shown in the embodiment below are mere examples, and are therefore not intended to limit the present disclosure. As such, among the structural elements in the embodiment below, structural elements not recited in any one of the independent claims defining the most generic concepts of the present disclosure are described as optional structural elements.

Note also that each figure is a schematic illustration and not necessarily a precise illustration. Furthermore, throughout the figures, the same structural elements share the same reference signs.

Embodiment

Hereinafter, an embodiment will be described with reference to FIG. 1 to FIG. 6.

[Configuration of Illumination System]

Figure 1:
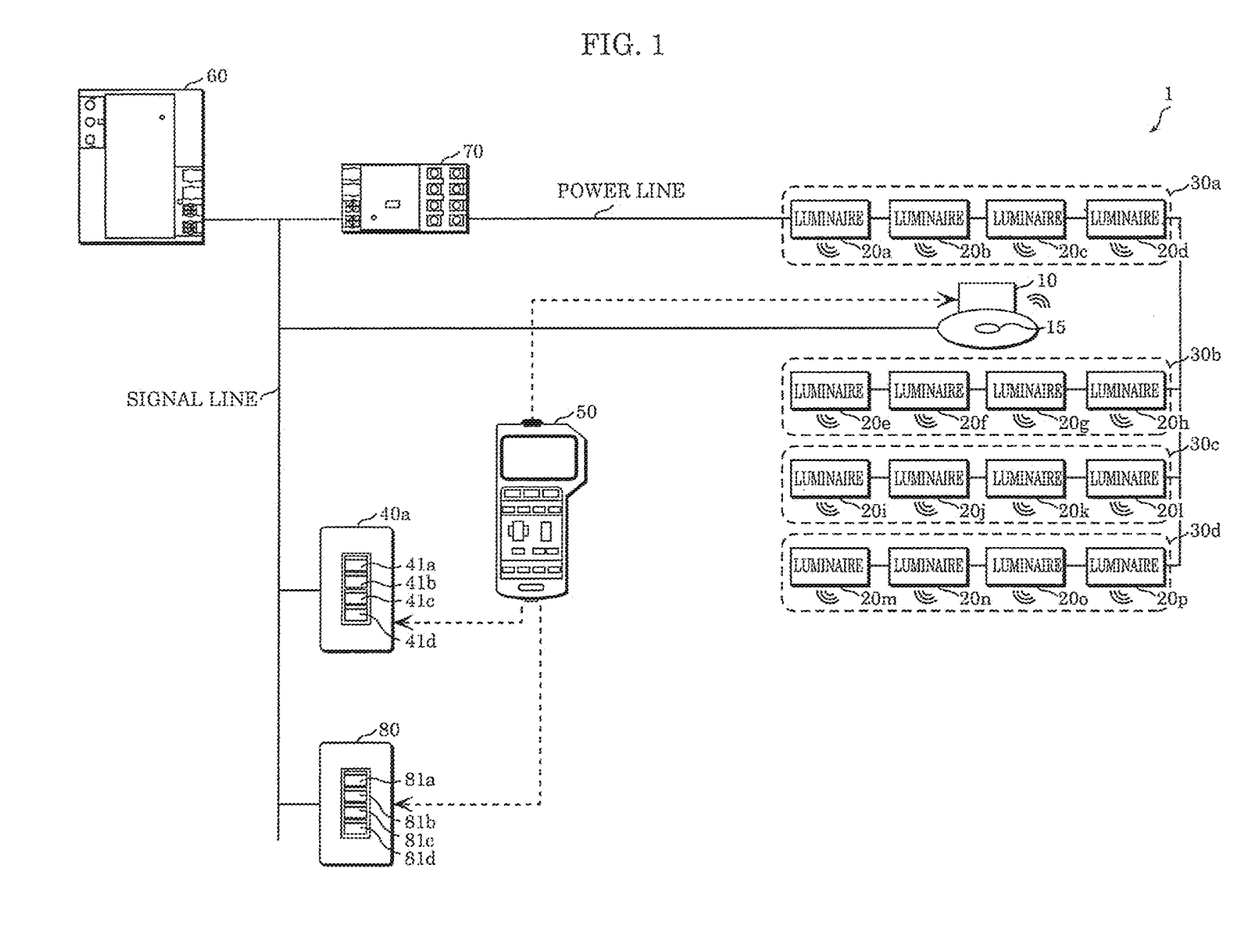
FIG. 1 is a configuration diagram illustrating an example of an illumination system according to an embodiment.

FIG. 1 is a configuration diagram illustrating an example of illumination system 1 according to the embodiment.

Illumination system 1 is a system for the light intensity control on luminaires, for example, and includes a plurality of luminaires (here, luminaires 20a to 20p) and controller 10 including brightness sensor 15 that detects the brightness of luminaires. Brightness sensor 15 is used for the light intensity control on luminaires. Illumination system 1 further includes: switch 40a provided outside controller 10 for switching the operation mode (the details are described later) of controller 10; setting device 50 that makes a setting regarding control on a plurality of luminaires; master device 60 that controls a plurality of luminaires; relay 70 that switches ON and OFF power supply to a plurality of luminaires; and switch 80 that gives an instruction on a light intensity rate from outside controller 10. Note that the control performed on the luminaires refers to, for example, the light intensity control, color temperature control, and ON and OFF control performed on the luminaires.

Figure 2:
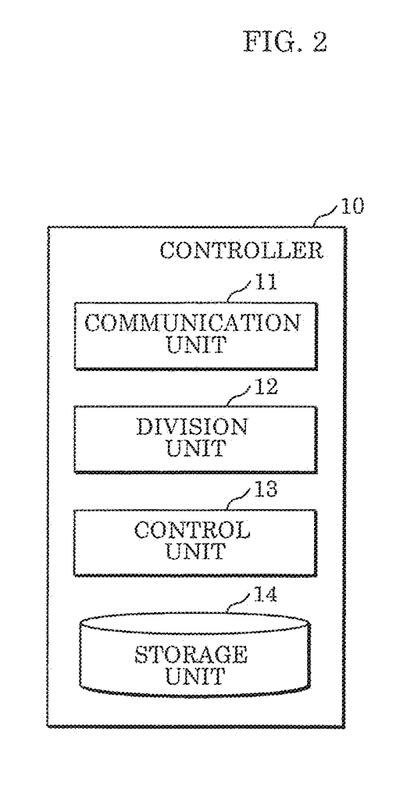
FIG. 2 is a configuration diagram illustrating an example of a controller according to the embodiment.

First, the following describes controller 10 with reference to FIG. 2. FIG. 2 is a configuration diagram illustrating an example of controller 10 according to the embodiment.

Controller 10 is a computer including a processor (microprocessor), a communication circuit, a power source circuit, etc., and includes communication unit (communicator) 11, division unit (divider) 12, control unit (controller) 13, and storage unit 14. Storage unit 14 is a read-only memory (ROM), a random-access memory (RAM), etc., and may include a nonvolatile memory, for example. Communication unit 11 is realized by a communication circuit. The communication circuit includes, for example, a transmission and reception circuit that transmits and receives a control signal to and from master device 60 and a wireless circuit (including an antenna, for example) that transmits and receives a wireless signal to and from a plurality of luminaires and to and from setting device 50. The processor performs processing to control communication unit 11, division unit 12, control unit 13, etc., by executing a program stored in storage unit 14. Division unit 12 and control unit 13 are functional structural elements of controller 10.

Controller 10 is installed in the vicinity of the place where luminaires are installed, and brightness sensor 15 included in controller 10 detects the brightness of the luminaires by detecting the illuminance of the floor surface etc. irradiated by the luminaires. In the present embodiment, controller 10 is installed in the vicinity of the place where luminaires 20a to 20d are installed, and brightness sensor 15 detects the brightness of luminaires 20a to 20d by detecting the illuminance of the floor surface etc. irradiated by luminaires 20a to 20d. For example, the light intensity control is performed on luminaires 20a to 20d to cause the brightness detected by brightness sensor 15 to be a predetermined set value (the constant illuminance control). Specifically, the light intensity rate of luminaires 20a to 20d is decreased when the detected brightness is higher than the predetermined brightness set value, and the light intensity rate of luminaires 20a to 20d is increased when the detected brightness is lower than the predetermined brightness set value. The predetermined brightness set value is stored in storage unit 14, for example. Controller 10 performs the light intensity control on luminaires 20a to 20d according to the brightness detected by brightness sensor 15 and the predetermined brightness set value.

Communication unit 11 wirelessly communicates with a plurality of luminaires. Controller 10 performs the light intensity control on a plurality of luminaires by transmitting a control signal regarding the light intensity control to the plurality of luminaires. For example, specified low power radio using a 920 MHz or 916-928 MHz band frequency is used for communication between controller 10 and the plurality of luminaires. Specified low power radio is defined in item 2 in paragraph 4 of Article 6 of the regulations for enforcement of the Radio Act in the ordinance of the Ministry of Internal Affairs and Communications of Japan. In the specified low-power wireless communication, a radio communication is carried out in specified ranges of frequency, with low power which is less than or equal to 10 mW, for example. The communicable distance within which the communication is possible using the specified low power radio is approximately 35 m, which covers the distance within which brightness sensor 15 can detect brightness. In other words, luminaires 20a to 20d whose brightness is detected by brightness sensor 15 are installed within the communicable distance.

Note that controller 10 can also communicate with luminaires installed outside the distance within which brightness sensor 15 can detect brightness, so long as the luminaires are within the communicable distance. Controller 10 performs the light intensity control on such luminaires according to an instruction on a light intensity rate provided from outside controller 10 (the external control). For example, controller 10 performs the external control on luminaires 20e to 20p.

Division unit 12 (controller 10) divides a plurality of luminaires into a plurality of groups. Specifically, division unit 12 divides a plurality of luminaires into a plurality of groups according to an instruction provided from outside controller 10 for dividing a plurality of luminaires into a plurality of groups. The instruction provided from outside is, for example, an instruction from setting device 50. The instruction includes information for associating the plurality of luminaires with addresses. For example, luminaires 20a to 20d are associated with the same address (for example, 1ch-1), luminaires 20e to 20h are associated with the same address (for example, 1ch-2), luminaires 20i to 20l are associated with the same address (for example, 1ch-3), luminaires 20m to 20p are associated with the same address (for example, 1ch-4). With this, division unit 12 divides the plurality of luminaires into the following groups each composed of luminaires associated with the same address: group 30a composed of luminaires 20a to 20d, group 30b composed of luminaires 20e to 20h, group 30c composed of luminaires 20i to 20l, and group 30d composed of luminaires 20m to 20p.

Control unit 13 (controller 10) performs the light intensity control in a first mode or a second mode for each of the plurality of groups divided into by division unit 12. The first mode is a mode in which the light intensity control is performed according to a result of detection by brightness sensor 15 (that is, a mode in which the constant illuminance control is performed), and the second mode is a mode in which the light intensity control is performed according to an instruction on the light intensity rate provided from outside controller 10 (that is, a mode in which the external control is performed). Specifically, the first mode is a mode in which the light intensity control is automatically performed according to feedback to cause the brightness detected by brightness sensor 15 to be a predetermined set value. The second mode is a mode in which the light intensity control is manually performed to cause a light intensity rate of one or more luminaires to be a light intensity rate indicated by the instruction on the light intensity rate provided from outside. Although the details are described later, control unit 13 performs the light intensity control on luminaires 20a to 20d of group 30a in the first mode, and performs the light intensity control on luminaires 20e to 20p of groups 30b to 30d in the second mode.

Further, control unit 13 switches the operation mode between the first mode and the second mode for each of the plurality of groups. For luminaires 20a to 20d of group 30a, control unit 13 switches the operation mode between the first mode and the second mode by performing the light intensity control in the first mode during the daytime when the brightness is variable by natural light, for example, and performing the light intensity control in the second mode during the nighttime, for example.

The plurality of luminaires are devices each of which includes a light source, can be switched ON and OFF, and can change the light intensity rate (brightness). As described above, in the present embodiment, the plurality of luminaires are luminaires 20a to 20p installed within a region in which wireless communication with controller 10 is possible. Luminaires 20a to 20d are installed within a region in which the brightness can be detected by brightness sensor 15, whereas luminaires 20e to 20p are installed outside that region. The plurality of luminaires are supplied with electric power via relay 70.

Switch 40a is a switch provided outside controller 10, for example, to allow control unit 13 to switch the operation mode between the first mode and the second mode for each of the plurality of groups, and is a wall switch provided on a wall of a building to which illumination system 1 is applied. For example, switch 40a has four buttons 41a to 41d as illustrated in FIG. 1. For example, each button has two states, namely, ON state and OFF state, and has a function to cause controller 10 to perform the light intensity control on a plurality of luminaires in the second mode in the case of the ON state and cause controller 10 to perform the light intensity control on a plurality of luminaires in the first mode in the case of the OFF state.

For example, button 41a is associated with address 1ch-1, and in the case of the ON state, causes controller 10 to perform the light intensity control on luminaires 20a to 20d associated with address 1ch-1 in the second mode, and in the case of the OFF state, causes controller 10 to perform the light intensity control on luminaires 20a to 20d in the first mode. Likewise, button 41b is associated with address 1ch-2, and causes controller 10 to perform the light intensity control on luminaires 20e to 20h associated with address 1ch-2 while switching between the first mode and the second mode. Button 41c is associated with address 1ch-3, and causes controller 10 to perform the light intensity control on luminaires 20i to 20l associated with address 1ch-3 while switching between the first mode and the second mode. Button 41d is associated with address 1ch-4, and causes controller 10 to perform the light intensity control on luminaires 20m to 20p associated with address 1ch-4 while switching between the first mode and the second mode. For example, during the daytime, button 41a is put into the OFF state and buttons 41b to 41d are put into the ON state to cause control unit 13 to perform the light intensity control on luminaires 20a to 20d of group 30a in the first mode and perform the light intensity control on luminaires 20e to 20p of groups 30b to 30d in the second mode. For example, during the nighttime, button 41a is also put into the ON state to cause control unit 13 to also perform the light intensity control on luminaires 20a to 20d of group 30a in the second mode.

Switch 80 is a switch provided outside controller 10 to give an instruction on the light intensity rate when control unit 13 perform the light intensity control in the second mode, and is, for example, a wall switch provided on a wall of a building to which illumination system 1 is applied. Switch 80 gives an instruction on the light intensity rate from outside controller 10. For example, switch 80 has four buttons 81a to 81d as illustrated in FIG. 1. Each button is associated with a desired light intensity rate. For example, each button has two states, namely, ON state and OFF state, and has a function to cause controller 10 to perform the light intensity control on a plurality of luminaires at the desired light intensity rate in the case of the ON state.

For example, button 81a is associated with address 1ch-1, button 81b is associated with address 1ch-2, button 81c is associated with address 1ch-3, and button 81d is associated with address 1ch-4. For example, if button 81a is in the ON state when the light intensity control in the second mode is to be performed on luminaires 20a to 20d associated with address 1ch-1, the light intensity control is performed on luminaires 20a to 20d at the light intensity rate associated with button 81a. If button 81b is in the ON state when the light intensity control in the second mode is to be performed on luminaires 20e to 20h associated with address 1ch-2, the light intensity control is performed on luminaires 20e to 20h at the light intensity rate associated with button 81b. If button 81c is in the ON state when the light intensity control in the second mode is to be performed on luminaires 20i to 20l associated with address 1ch-3, the light intensity control is performed on luminaires 20i to 20l at the light intensity rate associated with button 81c. If button 81d is in the ON state when the light intensity control in the second mode is to be performed on luminaires 20m to 20p associated with address 1ch-4, the light intensity control is performed on luminaires 20m to 20p at the light intensity rate associated with button 81d.

Setting device 50 generates setting information regarding control on a plurality of luminaires, and transmits the setting information to controller 10, switch 40a, switch 80, etc. The setting information transmitted to controller 10 includes, for example, an instruction for dividing a plurality of luminaires into a plurality of groups and information for associating a plurality of luminaires with addresses. The setting information transmitted to switch 40a includes, for example, information for associating each button of switch 40a with an address associated with a plurality of luminaires, as well as information for associating each button of switch 40a with one of the first mode and the second mode (here, the second mode) when the button is in the ON state and associating each button of switch 40a with the other mode (here, the first mode) when the button is in the OFF state. The setting information transmitted to switch 80 includes, for example, information for associating each button of switch 80 with an address associated with a plurality of luminaires, as well as information for associating each button of switch 80 with a desired light intensity rate of luminaires on which the light intensity control is to be performed in the second mode.

With this, controller 10 (division unit 12) can divide a plurality of luminaires into a plurality of groups, switch 40a can cause control unit 13 to switch the operation mode between the first mode and the second mode, and switch 80 can cause the light intensity rate of luminaires on which the light intensity control is performed in the second mode to be a desired light intensity rate.

Master device 60 is a master controller that operates as a central element of illumination system 1.

For example, switch 40a once transmits information regarding the ON state and the OFF state of buttons 41a to 41d to master device 60. For example, when button 41a is in the OFF state, information indicating that the light intensity control is to be performed on the luminaires having address 1ch-1 in the first mode is once transmitted to master device 60. Then, based on the information, master device 60 instructs controller 10 to perform the light intensity control on the luminaires having address 1ch-1 in the first mode.

For example, switch 80 once transmits information regarding the ON state and the OFF state of buttons 81a to 81d to master device 60. For example, when button 81b is in the ON state, information indicating that the light intensity control is to be performed on the luminaires having address 1ch-2 at a desired light intensity rate is once transmitted to master device 60. Then, when button 41b is in the ON state, that is, when the light intensity control is to be performed on the luminaires having address 1ch-2 in the second mode, master device 60 instructs, based on the information, controller 10 to perform the light intensity control on the luminaires having address 1ch-2 at the desired light intensity rate.

In such a manner as described, master device 60, as the central element of illumination system 1, controls a plurality of luminaires. However, as for the luminaires on which the light intensity control is performed in the first mode, the light intensity control is performed without intervention of master device 60. As described above, the predetermined brightness set value is stored in, for example, storage unit 14 of controller 10, and controller 10 performs the light intensity control on the luminaires on which the light intensity control is to be performed in the first mode (luminaires 20a to 20d), according to the brightness detected by brightness sensor 15 and the predetermined brightness set value.

Note that the predetermined brightness set value may be stored in master device 60. Controller 10 may transmit, to master device 60, information regarding the brightness of luminaires 20a to 20d detected by brightness sensor 15, and master device 60 may perform the light intensity control on luminaires 20a to 20d according to the information received and the predetermined brightness set value stored in master device 60. In this case, the light intensity control is performed on luminaires 20a to 20d by master device 60 transmitting a control signal regarding the light intensity control to controller 10 and by controller 10 transmitting the received control signal to luminaires 20a to 20d.

Relay 70 is a switch for switching ON and OFF the power supply to a plurality of luminaires. For example, relay 70 switches ON and OFF the power supply to a plurality of luminaires according to an instruction from master device 60.

Although the configuration of illumination system 1 has been described above, the configuration of illumination system 1 is not limited to the one illustrated in FIG. 1.

Figure 3:
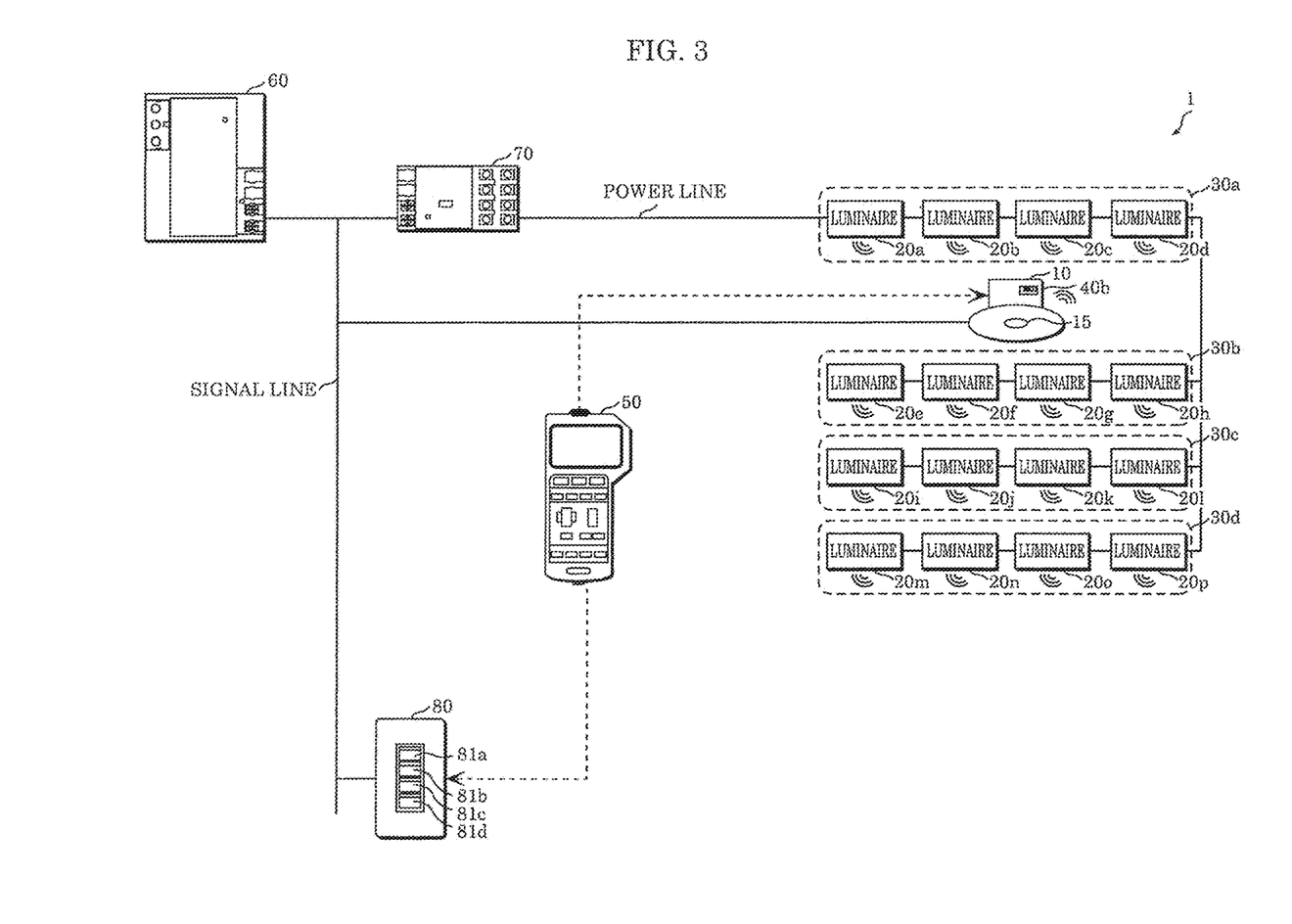
FIG. 3 is a configuration diagram illustrating another example of the illumination system according to the embodiment.
Figure 5:
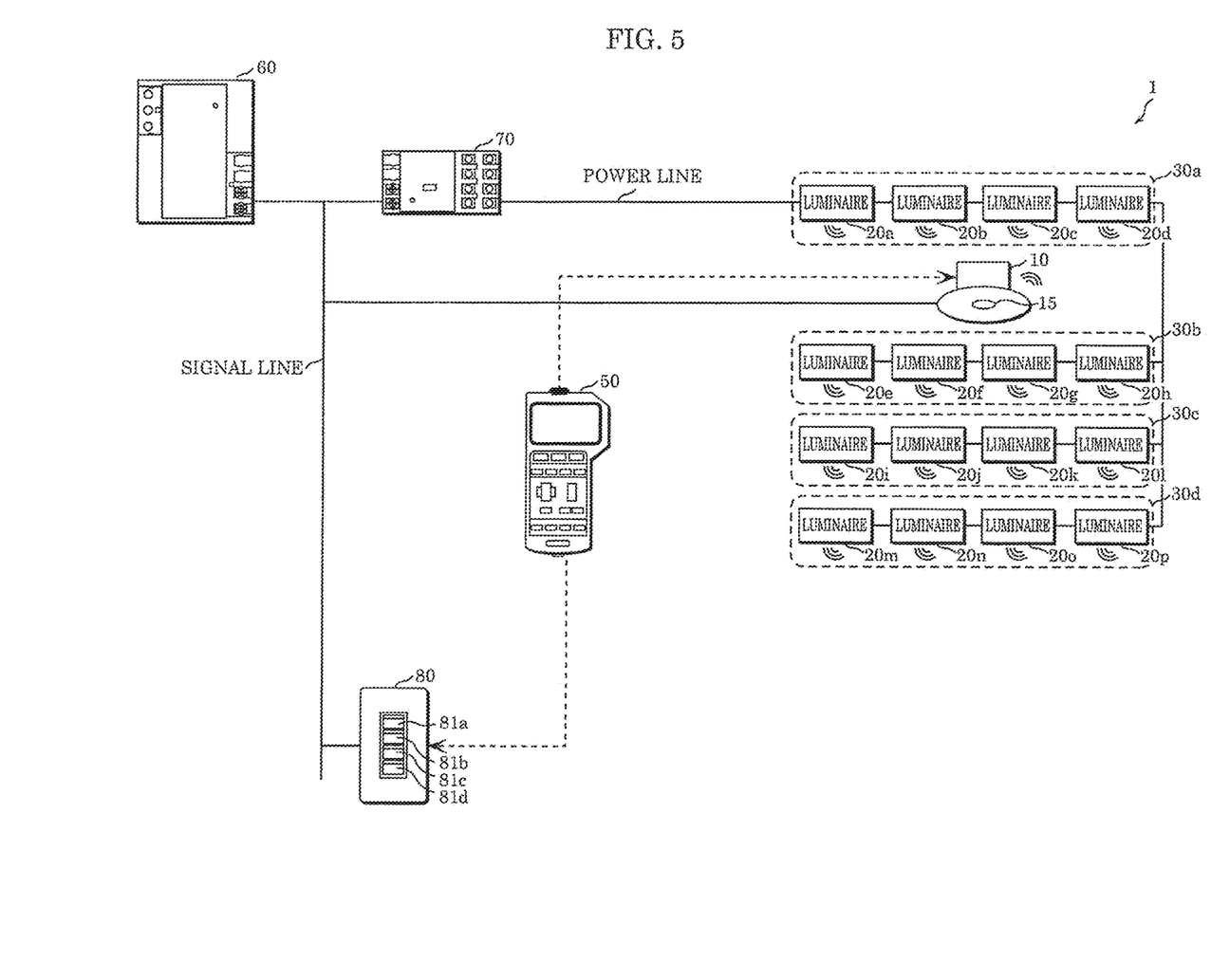
FIG. 5 is a configuration diagram illustrating another example of the illumination system according to the embodiment.

FIG. 3 and FIG. 5 are configuration diagrams each illustrating another example of illumination system 1 according to the embodiment.

As illustrated in FIG. 3, illumination system 1 need not include switch 40a, and controller 10 may include switch 40b instead.

Switch 40b is a switch provided at, for example, the casing of controller 10 to allow control unit 13 to switch the operation mode between the first mode and the second mode for each of a plurality of groups.

Figure 4:
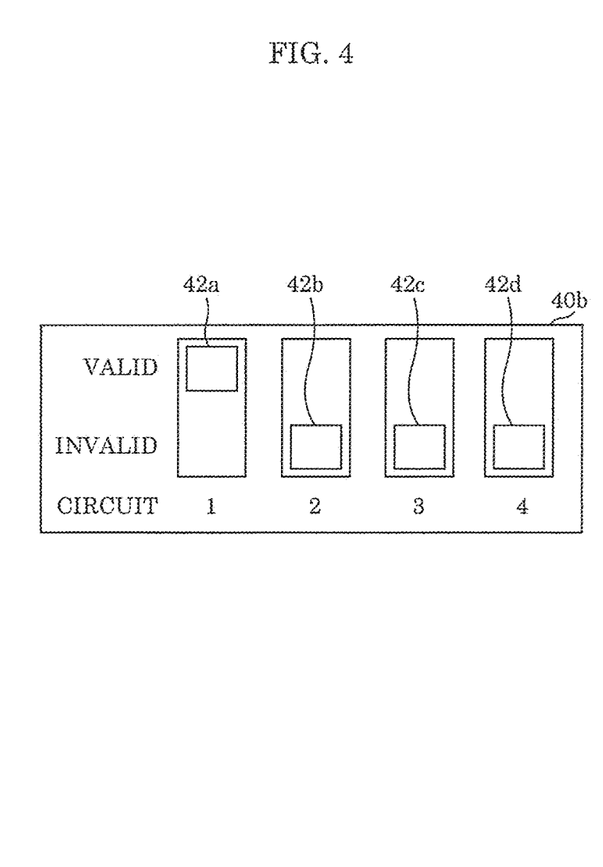
FIG. 4 is an exterior appearance diagram illustrating an example of a switch provided at a controller.

FIG. 4 is an exterior appearance diagram illustrating an example of switch 40b provided at controller 10.

For example, as illustrated in FIG. 4, switch 40b has four switches 42a to 42d. For example, switches 42a to 42d correspond to buttons 41a to 41d of switch 40a, and the state in which switches 42a to 42d are at valid positions illustrated in FIG. 4 is the same as the OFF states of buttons 41a to 41d. That is to say, for example, when switch 42a is at the valid position as illustrated in FIG. 4, control unit 13 performs the light intensity control on luminaires 20a to 20d of group 30a in the first mode. Further, for example, when switches 42b to 42d are at the invalid position as illustrated in FIG. 4, control unit 13 performs the light intensity control on luminaires 20e to 20p of groups 30b to 30d in the second mode.

In such a manner as described, switch 40b having the same function as switch 40a may be provided at the casing of controller 10, rather than outside controller 10.

Furthermore, as illustrated in FIG. 5, illumination system 1 may include neither switch 40a nor switch 40b. In this case, the instruction provided from outside (setting device 50) for division unit 12 to divide a plurality of luminaires into a plurality of groups includes information indicating, for each of the plurality of groups, in which operation mode the light intensity control is to be performed, that is, the first mode or the second mode.

Figure 6:
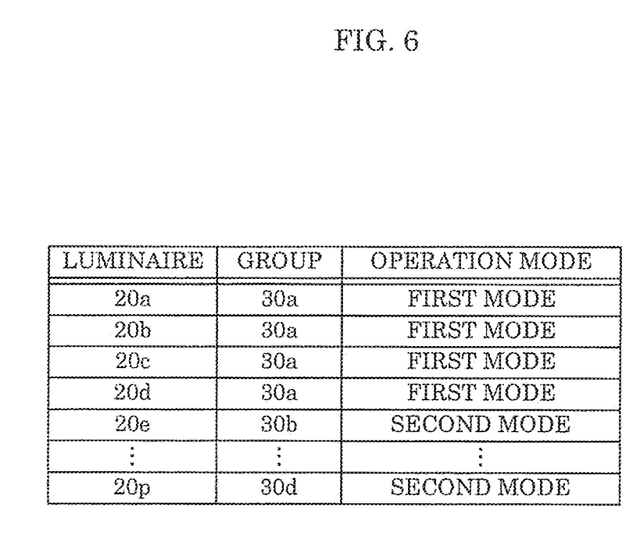
FIG. 6 is a diagram illustrating an example of an instruction provided from outside for dividing a plurality of luminaires into a plurality of groups.

FIG. 6 is a diagram illustrating an example of an instruction provided from outside for dividing a plurality of luminaires into a plurality of groups.

As illustrated in FIG. 6, this instruction includes association between luminaires and groups for dividing a plurality of luminaires into a plurality of groups. Although FIG. 6 illustrates the group names, the instruction actually includes, for example, association between each luminaire and an address (for example, 1ch-1 described above) associated with the luminaire, and luminaires associated with the same address are classified into the same group. For example, in FIG. 6, luminaires 20a to 20d are associated with the same address, and thus, luminaires 20a to 20d are classified into the same group 30a. Further, as illustrated in FIG. 6, the instruction includes information indicating, for each luminaire, whether the light intensity control is to be performed in the first mode or the second mode. For example, the instruction includes information indicating that the light intensity control is to be performed on luminaires 20a to 20d in the first mode.

As described above, the operation mode need not be switched by a switch such as switch 40a or switch 80. For example, the operation mode may be switched according to information included in the instruction provided from outside (setting device 50) and indicating, for each of the plurality of groups, in which operation mode the light intensity control is to be performed, that is, the first mode or the second mode.

Advantageous Effects, Etc.

As described above, illumination system 1 according to the present embodiment includes: a plurality of luminaires; and controller 10 including brightness sensor 15 that is used for light intensity control on one or more luminaires among the plurality of luminaires and detects the brightness of the one or more luminaires. Controller 10 includes: division unit 12 configured to divide the plurality of luminaires into a plurality of groups; and control unit 13 configured to perform the light intensity control in a first mode or a second mode for each of the plurality of groups. The first mode is a mode in which the light intensity control is performed according to a result of detection by brightness sensor 15, and the second mode is a mode in which the light intensity control is performed according to an instruction on a light intensity rate provided from outside.

The plurality of luminaires include: luminaires 20a to 20d which are installed in a region where the brightness is variable by natural light etc. (for example, a region by a window) and on which the light intensity control is performed according to the result of detection by brightness sensor 15 (the constant illuminance control); and luminaires 20e to 20p which are installed in a region where the brightness is less likely to be varied by natural light etc. (for example, a region distant from a window or a room without a window) and on which the constant illuminance control need not be performed but the light intensity control is performed according to, for example, an instruction on a light intensity rate provided from outside (the external control). Controller 10 can operate in the first mode in which the light intensity control is performed according to the result of detection by brightness sensor 15 and the second mode in which the light intensity control is performed according to an instruction on a light intensity rate provided from outside. Therefore, it is unnecessary to prepare both a controller for the luminaires on which the constant illuminance control is performed and a controller for the luminaires on which the external control is performed. This means that it is possible to reduce the total cost of illumination system 1. In other words, it is possible to reduce the number of devices included in illumination system 1, while maintaining the function of illumination system 1, and it is therefore possible to reduce power consumption and resource wasting.

Further, control unit 13 may be configured to switch an operation mode between the first mode and the second mode for each of the plurality of groups.

With this, the operation mode of each group is not fixed but can be switched between the first mode and the second mode according to the situation etc. For example, the light intensity control can be performed in the first mode during the daytime when the brightness is variable by natural light, and the light intensity control can be performed in the second mode during the nighttime. In such a manner, the light intensity control can be effectively performed according to the result of detection by brightness sensor 15, thus making it possible to reduce power consumption.

For example, control unit 13 may be configured to switch the operation mode according to switching between the first mode and the second mode by switch 40a provided outside.

With this, the user can easily switch between the first mode and the second mode using switch 40a provided outside, such as a wall switch.

Further, for example, control unit 13 may be configured to switch the operation mode according to switching between the first mode and the second mode by switch 40b provided at the casing of controller 10.

For example, because controller 10, which includes brightness sensor 15, is commonly installed on the ceiling, it is difficult for the user to operate switch 40b provided at the casing of controller 10. However, when the operation mode of each group is determined in advance and there is no need to the switch the operation mode, it is only necessary to operate switch 40b once at the time of installation of controller 10, for example. As such, the difficulty of operating switch 40b is not likely to be problematic. Further, in this case, there is no need for, for example, installation work for switch 40a such as a wall switch, thus making it possible to reduce the total cost of illumination system 1.

Further, division unit 12 may be configured to divide the plurality of luminaires into the plurality of groups according to an instruction provided from outside for dividing the plurality of luminaires into the plurality of groups. The instruction provided from outside may include information indicating, for each of the plurality of groups, the operation mode in which the light intensity control is to be performed, the operation mode being the first mode or the second mode. Control unit 13 may be configured to switch the operation mode according to the information.

With this, transmission of information from setting device 50 etc. enables easy switching of the operation mode, without the need to prepare a wall switch such as switch 40a or a switch provided at the casing of controller 10 such as switch 40b. For example, when the layout of a plurality of luminaires etc. is to be changed, there is no need to make a setting for these switches again, thus enabling easy switching of the operation mode.

Furthermore, controller 10 may further include communication unit 11 that wirelessly communicate with the plurality of luminaires.

With this, since controller 10 and the plurality of luminaires are not connected by a wire, there is increased flexibility in dividing the plurality of luminaires into a plurality of groups.

Further, controller 10 according to the present embodiment is a controller in illumination system 1 that includes a plurality of luminaires and controller 10 including brightness sensor 15 used for light intensity control on one or more luminaires among the plurality of luminaires and detecting the brightness of the one or more luminaires. Controller 10 includes: division unit 12 configured to divide the plurality of luminaires into a plurality of groups; and control unit 13 configured to perform the light intensity control in a first mode or a second mode for each of the plurality of groups. The first mode is a mode in which the light intensity control is performed according to a result of detection by brightness sensor 15, and the second mode is a mode in which the light intensity control is performed according to an instruction on a light intensity rate provided from outside.

With this, it is possible to provide controller 10 capable of reducing the total cost of illumination system 1.

Other Embodiments

Although illumination system 1 and controller 10 according to an embodiment have been described above, the present disclosure is not limited to the above embodiment.

For example, although illumination system 1 in the above embodiment includes switch 40a, setting device 50, master device 60, relay 70, and switch 80, illumination system 1 need not include these. For example, when illumination system 1 does not include switch 40a, control unit 13 may switch the operation mode according to the switching between the first mode and the second mode by a switch provided outside illumination system 1. Further, for example, when illumination system 1 does not include setting device 50, division unit 12 may divide the plurality of luminaires into a plurality of groups according to an instruction provided from outside illumination system 1 for dividing the plurality of luminaires into a plurality of groups. Furthermore, for example, when illumination system 1 does not include switch 80, the second mode may be a mode in which the light intensity control is performed according to an instruction on a light intensity rate provided from outside illumination system 1.

In addition, for example, control unit 13 in the above embodiment switches the operation mode between the first mode and the second mode for each of the plurality of groups, the operation mode need not be switched. That is to say, the operation mode may be fixed for each of the plurality of groups.

Further, for example, although controller 10 and the plurality of luminaires wirelessly communicate with one another in the above embodiment, they may communicate with one another via wired communication.

Furthermore, the present disclosure can be realized not only as illumination system 1 and controller 10, but also as a method including steps (processing) performed by each structural element of illumination system 1 and controller 10.

For example, these steps may be executed by a computer (a computer system). The present disclosure can be realized as a program that causes the computer to execute the steps included in the method. The present disclosure can be also realized as a non-transitory computer-readable recording medium, such as a compact disc-read-only memory (CD-ROM), having the program recorded thereon.

For example, when the present disclosure is realized as a program (software), each step is executed by the program being executed using hardware resources such as a CPU, memory, and an input/output circuit of a computer. In other words, each step is executed by the CPU performing computation on data obtained from, for example, the memory or the input/output circuit and outputting the result of the computation to, for example, the memory or the input/output circuit.

The structural elements included in illumination system 1 and controller 10 according to the above embodiment may be realized as a specialized circuit or a general purpose circuit.

Further, the structural elements included in illumination system 1 and controller 10 according to the above embodiment may be realized as large scale integration (LSI) that is an integrated circuit (IC).

The integrated circuit is not limited to LSI, and a specialized circuit or a general purpose processor may be used. It is also possible to use a field programmable gate array (FPGA) that is programmable or a reconfigurable processor that allows reconfiguration of the connection and settings of circuit cells inside LSI.

Further, if a technology for implementing an integrated circuit that supersedes LSI is introduced as a result of development in the semiconductor technology or another derivative technology, the structural elements included in illumination system 1 and controller 10 may surely be realized as integrated circuits using that technology.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination system, comprising:
a plurality of luminaires; and
a controller including a brightness sensor that is used for light intensity control on one or more luminaires among the plurality of luminaires and detects a brightness of the one or more luminaires and including a communicator that wirelessly communicates with the plurality of luminaires,
wherein the controller:
divides the plurality of luminaires into a plurality of groups to classify, into a same group, luminaires among the plurality of luminaires that are associated with a same address; and
performs the light intensity control in a first mode or a second mode for each of the plurality of groups,
the first mode is a mode in which the light intensity control is performed according to a result of detection by the brightness sensor, and
the second mode is a mode in which the light intensity control is performed according to an instruction on a light intensity rate provided from outside.

2. The illumination system according to claim 1, wherein the controller switches an operation mode between the first mode and the second mode for each of the plurality of groups.

3. The illumination system according to claim 2, wherein the controller switches the operation mode according to switching between the first mode and the second mode by a switch provided outside.

4. The illumination system according to claim 3, wherein the switch provided outside includes a plurality of buttons,
each of the plurality of buttons is associated with an address that is associated with one or more luminaires among the plurality of luminaires, and
the controller performs, on one or more luminaires among the plurality of luminaires that correspond to an address associated with a given button among the plurality of buttons, the light intensity control in the first mode or the second mode according to a state of the given button.

5. The illumination system according to claim 2, wherein the controller switches the operation mode according to switching between the first mode and the second mode by a switch provided at a casing of the controller.

6. The illumination system according to claim 5, wherein the switch provided at the casing of the controller includes a plurality of switches,
each of the plurality of switches is associated with an address that is associated with one or more luminaires among the plurality of luminaires, and
the controller performs, on one or more luminaires among the plurality of luminaires that correspond to an address associated with a given switch among the plurality of switches, the light intensity control in the first mode or the second mode according to a state of the given switch.

7. The illumination system according to claim 2, wherein the controller divides the plurality of luminaires into the plurality of groups according to an instruction provided from outside for dividing the plurality of luminaires into the plurality of groups,
the instruction provided from outside includes information indicating, for each of the plurality of groups, the operation mode in which the light intensity control is to be performed, the operation mode being the first mode or the second mode, and the controller switches the operation mode according to the information.

8. The illumination system according to claim 7, wherein the instruction provided from outside includes information for associating the plurality of luminaires with addresses.

9. The illumination system according to claim 1, wherein the first mode is a mode in which the light intensity control is automatically performed according to feedback to cause the brightness detected by the brightness sensor to be a predetermined set value.

10. The illumination system according to claim 1, wherein the second mode is a mode in which the light intensity control is manually performed to cause a light intensity rate of one or more luminaires among the plurality of luminaires to be a light intensity rate indicated by the instruction on the light intensity rate provided from outside.

11. The illumination system according to claim 1, further comprising:

a master device that controls the plurality of luminaires, wherein the master device receives information indicating which one of the first mode and the second mode the light intensity control is to be performed in, and indicating on which luminaire among the plurality of luminaires the light intensity control is to be performed in the mode indicated, and instructs, based on the information, the controller to perform the light intensity control in the mode indicated by the information, on the luminaire indicated by the information.

12. A controller in an illumination system that includes a plurality of luminaires and the controller including a brightness sensor used for light intensity control on one or more luminaires among the plurality of luminaires and detecting a brightness of the one or more luminaires and including a communicator that wirelessly communicates with the plurality of luminaires, wherein the controller:

divides the plurality of luminaires into a plurality of groups to classify, into a same group, luminaires among the plurality of luminaires that are associated with a same address; and performs the light intensity control in a first mode or a second mode for each of the plurality of groups, the first mode is a mode in which the light intensity control is performed according to a result of detection by the brightness sensor, and the second mode is a mode in which the light intensity control is performed according to an instruction on a light intensity rate provided from outside.

13. A method for controlling a controller in an illumination system that includes a plurality of luminaires and the controller including a brightness sensor used for light intensity control on one or more luminaires among the plurality of luminaires and detecting a brightness of the one or more luminaires, the method comprising:

wirelessly communicate with the plurality of luminaires;

dividing the plurality of luminaires into a plurality of groups to classify, into a same group, luminaires among the plurality of luminaires that are associated with a same address; and performing the light intensity control in a first mode or a second mode for each of the plurality of groups, wherein the first mode is a mode in which the light intensity control is performed according to a result of detection by the brightness sensor, and the second mode is a mode in which the light intensity control is performed according to an instruction on a light intensity rate provided from outside.

* * * * *